S. SCOOLER.
MILLBOARD MACHINE.
APPLICATION FILED APR. 11, 1911.

1,001,896.

Patented Aug. 29, 1911.
5 SHEETS—SHEET 1.

WITNESSES:
John C. Sanders
Leon Spring

INVENTOR:
Sidney Scooler
BY
ATT'Y

S. SCOOLER.
MILLBOARD MACHINE.
APPLICATION FILED APR. 11, 1911.

1,001,896.

Patented Aug. 29, 1911.

WITNESSES:
John C. Sanders
Leon Spring

INVENTOR:
Sidney Scooler
BY
ATTY.

COLUMBIA PLANOGRAPH CO., WASHINGTON, D. C.

S. SCOOLER.
MILLBOARD MACHINE.
APPLICATION FILED APR. 11, 1911.

1,001,896.

Patented Aug. 29, 1911.
5 SHEETS—SHEET 5.

WITNESSES:
John C. Sanders
Leon Spring

INVENTOR:
Sidney Scooler,
BY
ATTY.

UNITED STATES PATENT OFFICE.

SIDNEY SCOOLER, OF PORSCHENDORF, NEAR DÜRRRÖHRSDORF, GERMANY, ASSIGNOR TO THE FIRM OF LOUIS FÜRSTENHEIM, OF PORSCHENDORF, GERMANY.

MILLBOARD-MACHINE.

1,001,896.  Specification of Letters Patent.  Patented Aug. 29, 1911.

Application filed April 11, 1911. Serial No. 620,380.

*To all whom it may concern:*

Be it known that I, SIDNEY SCOOLER, a subject of the King of Saxony, and residing at Porschendorf, near Dürrröhrsdorf, in the Kingdom of Saxony and Empire of Germany, have invented certain new and useful Improvements in Millboard-Machines, of which the following is a specification.

It has already been proposed to provide the forming cylinder of millboard-machines with automatic devices for cutting up its cover consisting of superposed layers of material into boards, the device consisting of knives radially movable in longitudinal recesses of the forming cylinder and of means for operating the knives on the cover of the cylinder having attained the desired thickness. However such automatic devices have failed to give satisfactory results, chiefly for the reason that the radial motion of the knives alone did not guarantee a clean cut of the millboard and for thinner boards the knives even refused to act. The only effect, if any, of the radial motion of the knives consisted in tearing up the cover. The millboards, more particularly the better sorts made from long-staple material, offer so great a resistance against tearing up, that an excessively large power was required for actuating these knives. Consequently such automatic devices could be employed only for quite thin millboard made from short-staple material, although their advantage is far below reasonable expectance.

My invention relates to improvements in such automatic devices, whereby the said disadvantages are avoided and the device is rendered capable of easily and safely cutting up the millboard while requiring less power than hitherto, and also of easily taking off the cut boards from the forming cylinder and transferring them to the laying-off mechanism.

The chief improvement consists in means for moving the knives diagonally instead of radially, that is in a direction at an acute angle to the side of the forming cylinder, so that the knives are drawn through the millboard and thus easily cut it through.

Another improvement consists in a roll adapted to bear from a side upward against the forming cylinder and provided with a longitudinal groove for permitting the knives in the forming cylinder to periodically engage one after the other in it.

A third improvement consists in pushing-off rules connected with the knives and adapted to push the edge of the cut millboard off from the forming cylinder and to press it against the said roll. These rules are each placed on one side of the corresponding knife, so that the longitudinal recess of the forming cylinder requires to have an inside width at least like the sum of the thickness of the knife and the pushing-off rule. This width is not inconsiderable and would produce a wet strip in the cover of the forming cylinder formed from several superposed layers of pulp mostly deprived of water, which strip would irregularly tear up on the knife being actuated. In order to avoid this defect, each pushing-off rule is so connected with its knife, as to normally occupy a position in which its outer surface flushes with the outer surface of the forming cylinder and that it can be taken along with by the knife only after the latter has produced the cut and moved through a part of its stroke. The knife is at the same time retarded by the pushing-off rule during the rest of its stroke. In this manner the width of the actual space in each longitudinal recess of the forming cylinder is considerably diminished, whereby the formation of the said wet strip in the cover is reduced, if not altogether avoided.

A fourth improvement consists in providing the roll with means for attracting the edge of the cut millboard, so that this millboard can be unwound from the forming cylinder and passed between the roll and another smaller roll to the laying-off mechanism. The attraction of the millboard by the roll is preferably effected by means of a vacuum.

A fifth improvement consists in means for automatically turning on the vacuum to the roll and for turning it off. Other improvements will be hereinafter described and pointed out in the claims.

I will now proceed to describe my invention with reference to the accompanying drawings, in which—

Similar characters of reference refer to similar parts throughout the several views.

Figures 1, 2, 3, 4:
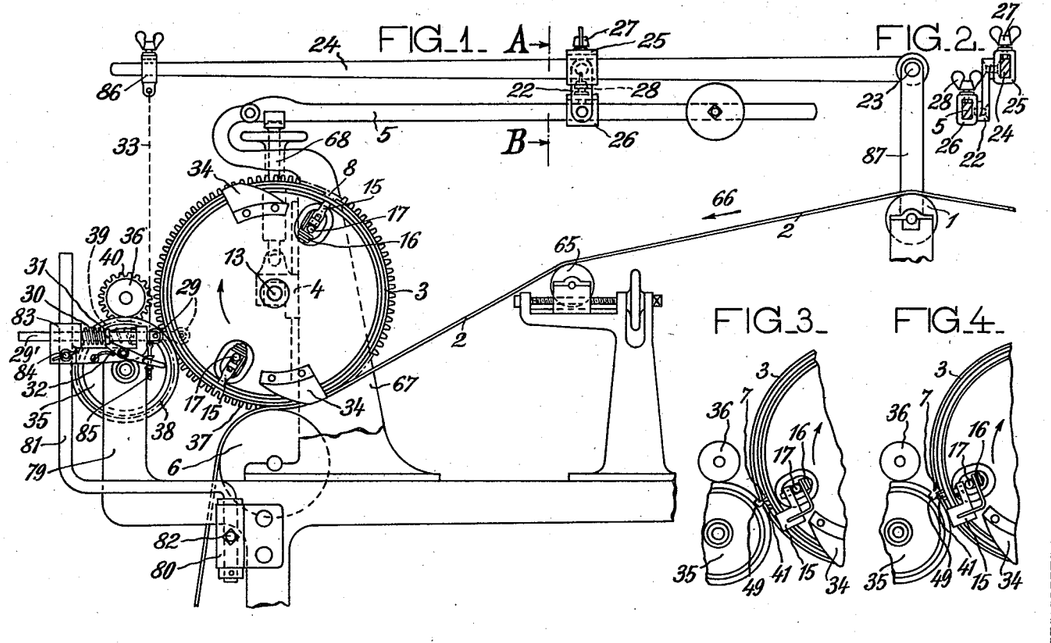
Figure 1 is an elevation of a part of a millboard-machine comprising an improved forming cylinder and the mechanism therewith connected.
Fig. 2 is a vertical cross section through the line A—B in Fig. 1, seen in the direction of the arrows.
Fig. 3 is a part out of Fig. 1 and illustrates the relative position of the forming cylinder and the roll at the moment that a knife has cut through the cover.
Fig. 4 is similar to Fig. 3 and illustrates the relative position of the parts at the moment that the pushing-off rule presses the edge of the cut millboard on the roll.

Fig. 1 illustrates the left part of a well known Strobel millboard machine, in which the pulp supplied from tanks through pipes to the vat and agitated therein is continuously deposited in a thin layer on the sieve-cylinder (dandy-roll). The layer of material partly deprived of water is transferred from the sieve-cylinder to an endless felt 2, which passes in the direction of the arrow 66 over sundry guiding rollers 1, 65 and the driving roll 6 and delivers the layer of material meanwhile further deprived of water up to the forming cylinder 3 which during its rotation is covered with an increasing number of layers of material, so that it is slowly raised through a small distance. The shaft 13 of the forming cylinder 3 is mounted to turn in bearings 4, which are vertically guided on two parallel standards 67 and are constantly pressed downward by weighted levers 5 with the aid of longitudinally adjustable rods 68 as usual.

Figure 5:
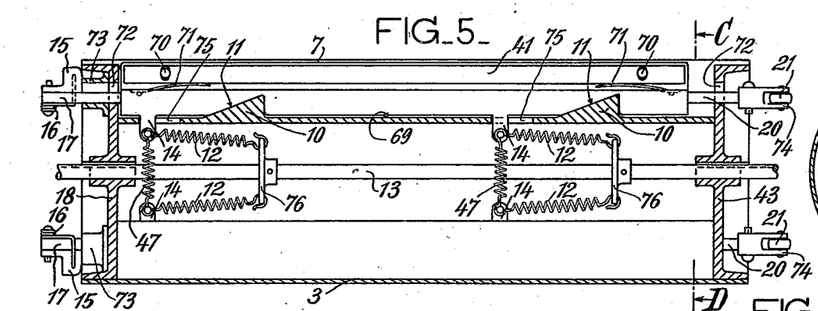
Fig. 5 is a vertical longitudinal section through an improved forming cylinder in the central plane for the upper half and in a plane before the central plane for the lower half.
Figure 6:
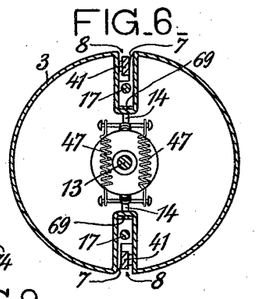
Fig. 6 is a vertical cross section through the same on the line C—D in Fig. 5, seen in the direction of the arrows.

The forming cylinder 3 has two opposite longitudinal recesses 8, 8 (Fig. 6), in each of which a knife 7 and a pushing-off rule 41 are guided. The cylinder 3 is provided with two wedges 10, 10 (Fig. 5) on the bottom of each recess 69 and each knife 7 has in its inner surface two notches, the inclined surfaces 11, 11 of which are adapted to slide on the corresponding surfaces of the wedges 10, 10. The knife 7 is over the whole length so cut out as to afford space for the pushing-off rule 41, which is radially guided on the knife 7 by means of two pins 70, 70 engaging in its oval holes. Two leaf springs 71, 71 are so inserted between the knife 7 and the rule 41, that normally the outer surface of the rule flushes with the outer surface of the cylinder 3. Each knife 7 is shown to be made in one with two rods 17 and 20 in a common axis, which rods project to without through oval holes 72, 72 in the two end disks 18, 43 of the cylinder 3. The left rod 17 in Fig. 5 is pivotally connected with a lock 15, which by a spring 16 (Figs. 5, 7, 9) is normally pressed into the plane of the rod 17 (Fig. 9), so that it bears against a distance piece 73 fastened on the left end disk 18 and thus prevents the knife 7 from longitudinally shifting. The right rod 20 is detachably connected with a fork 74, in which a roller 21 is mounted to turn. Each knife 7 has on its inner surface two lugs 14, 14, which pass through holes 75, 75 in the bottom of the recess 8. The opposite lugs 14, 14 of the two knives 7, 7 are elastically connected with one another by helical springs 47, 47, as is clearly shown at Fig. 6. On the shaft 13 are fastened two crossheads 76, 76, which are elastically connected with the lugs 14, 14 of the two knives 7, 7 by helical springs 12, 12. These springs serve for pressing each knife 7 to the right in Figs. 5 and 7. One of the two standards 67 (in Fig. 1 at the rear and in Fig. 7 on the right) is provided with a bracket 77, on which an annular disk 48 (Fig. 8) is fastened. This disk 48 has a piece 19 cut and bent to the right in Figs. 7 and 10. The two rollers 21, 21 are adapted to roll on the annular disk 48 during the rotation of the forming cylinder 3 in the direction of the arrow 78 in Fig. 8. It will be understood, that when the lock 15 in Fig. 9 of one knife 7 is in a manner to be described later on turned through a right angle into the position indicated by the dotted lines and when one roller 21 slips off the disk 48, the two springs 12, 12 of the corresponding knife 7 will by the lugs 14, 14 pull this knife to the right in Fig. 5, until the roller 21 strikes the bent piece 19, as is clearly shown at Figs. 7 and 8. At the same time the two wedges 10, 10 will have pushed the knife 7 outward by means of its two inclined faces 11, 11. This means, that the knife 7 is moved diagonally in a direction parallel to the inclined faces 11, 11, so that it projects from the cylinder 3. When supposing the cylinder 3 to be covered with material, this cover will check the pushing-off rule 41 and press it inwardly while overcoming the tension of the two leaf springs 71, 71, until the knife 7 in a manner to be described later on cuts through the cover, whereupon the knife by its shoulder presses the outer surface of the pushing-off rule 41 against the millboard. When during the continued rotation of the forming cylinder 3 the roller 21 rolls from the bent piece 19 on an inclined surface to the disk 48 the knife 7 will be thereby pushed to the left in Fig. 7, whereupon the spring 16 (Fig. 9) will turn the lock 15 into its normal position, whereby the knife moved inwardly is locked.

A roll 35 (Figs. 1, 3, 4) parallel to the forming cylinder 3 is mounted to turn in suitable parts 79 of the machine frame and is adapted to bear from a side upward against the forming cylinder 3. It is provided with a longitudinal groove 49, in which either knife 7 can engage. The roll 35 is geared to the forming cylinder 3 by means of a large gear wheel 37 fastened on the shaft 13 of the cylinder and a smaller gear wheel 38 fastened on the shaft of the roll 35. As the pitch circle of the gear wheel 37 has a slightly larger diameter than the cylinder 3 and the pitch circle of the gear wheel 38 has a slightly smaller diameter than the roll 35, it follows that the peripheral velocity of the roll 35 is slightly larger than that of the forming cylinder. The consequence of this is, that the sharp edge of either knife 7 can work at the proper moment with the corresponding edge of the roll 35 in the groove 49 for producing the cut and will further engage in this groove during the continued rotation of the roll without being damaged, since the wall of the groove terminating in the edge will move away from the sharp edge. Further the two rolls 35 and 36 will be enabled to pull the millboard from the forming cylinder, whereby the millboard will be slightly stretched, so that all the folds and other irregularities that may be in the millboard will disappear.

The large gear wheel 37 may be fastened on the shaft 31 at the front of the cylinder 3, but in Fig. 1 only its teeth are shown for the sake of clearness. The two rolls 35 and 36 are geared together by means of gear wheels 39 and 40, the pitch circles of which have the same diameter as the two rolls respectively, so that both rolls have the same peripheral velocity.

In a bearing 80 fastened on the frame (at the front in Fig. 1) a bent support 81 is mounted to turn, so that it can be brought into the position shown and therein secured by means of a screw 82 or moved aside. On the support 81 a forked bearing 83 can be vertically adjusted by means of a pressing screw 84 with a winged head. A horizontal rod 29' is longitudinally movable in the two parts of the forked bearing 83 and carries at the right end a roller 29 which can engage in the path of the two locks 15, 15. A helical spring 30 surrounding the rod 29' is inserted between the left part of the bearing 83 and a loose collar 31 fastened on the rod and tends to press this rod to the right in Fig. 1 into the position indicated by the dotted lines. A spring-pressed lock 32 is mounted on the bearing 83 to rock and is adapted to engage behind the collar 31 after the rod 29' has been pushed to the left, whereby it is locked. Two opposite cams 34, 34 fastened on the gear wheel 37 or on the forming cylinder 3, as the case may be, serve for pushing the roller 29 with its rod 29' into the normal position. The rear arm of the lock 32 engages in a hole of a slide 85, which is vertically guided on the front frame part 79 and is by a chain 33 or the like connected with a lever 24 by means of an adjustable piece 86. Preferably the chain 33 or its equivalent is in its length made adjustable in any known manner.

The lever 24 is mounted to rock on a pin 23 at some part 87 of the machine frame and is adjustably connected with the weighted lever 5 by means of a link 22, two sleeves 25, 26 and two adjusting screws 27, 28 with winged heads. By longitudinally adjusting the two sleeves 25, 26 the ratio of the vertical strokes of the shaft 13 of the forming cylinder 3 and of the rear arm of the lock 32 can be varied, so that on the cover on the cylinder attaining any determined thickness the lock 32 shall release the rod 29' and permit the roller 29 to engage in the path of the two locks 15, 15 on the cylinder 3. Then on the roller 29 striking the first lock 15, the latter will be turned into the position indicated by the dotted lines in Fig. 9, whereby its knife 7 is released, so that it is diagonally pulled by the corresponding springs 12, 12 (Fig. 7 above) and is caused to first cut the millboard through (Fig. 3) and afterward press the pushing-off rule 41 on the millboard (Fig. 4).

Figures 7, 8, 9:
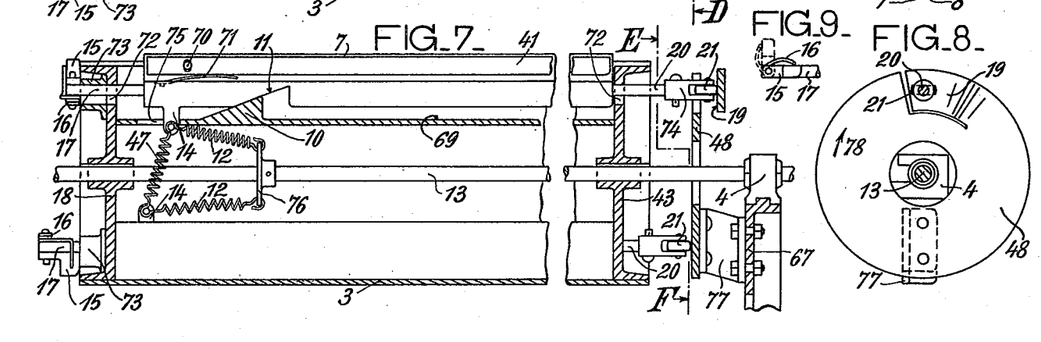
Fig. 7 is similar to Fig. 5 and shows a part of the frame with a device for operating the knives, the upper knife occupying its other extreme position and an intermediate part being omitted.
Fig. 8 is a vertical cross section through the broken line E—F in Fig. 7, seen in the direction of the arrows, and shows the device for operating the knives.
Fig. 9 is a detail.
Figure 10:
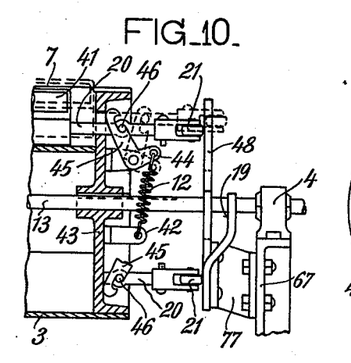
Fig. 10 is similar to the right part of Fig. 7 and illustrates a modification of the means for pressing the knives outward.
Figure 11:
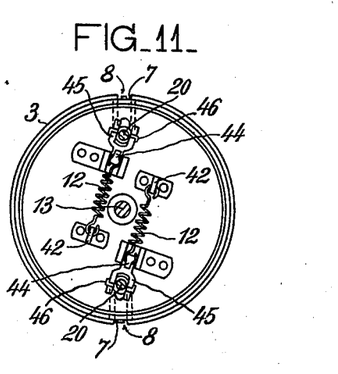
Fig. 11 is an end view of the forming cylinder in Fig. 10.
Figure 12:
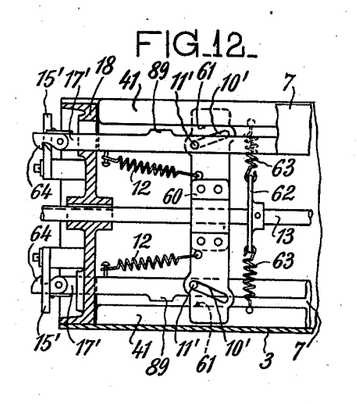
Fig. 12 is similar to the left part of Fig. 7 and illustrates a further modification of the means for guiding and pressing the knives outward.

Thereupon the inclined face on the bent piece 19 of the disk 48 (Fig. 8) will push the knife 7 by its roller 21 back into its initial position, when the spring 16 will return the lock 15 into its normal position, whereby the knife 7 is again locked. The cam 34 following the knife 7 will strike the roller 29 and thereby push back the rod 29' into its normal position. As, however, the forming cylinder 3 is still kept in its raised position by the cover remaining on it, of course the lock 32 is kept by the lever 24 out of reach of the collar 31, so that after the passage of the cam 34 the roller 29 is permitted to again move forward. It will strike the second lock 15, when the series of occurrences described will take place with reference to the second knife 7, so that the cover is cut into halves. On the second half of the cover leaving the passage between the forming cylinder and the felt 2 on the driving roll 6 the forming cylinder 3 will drop and be ready to wind on the thin layer of material supplied by the endless felt 2. The second cam 34 striking the roller 29 will thereby push the rod 29' into its normal position and the spring-pressed lock 32 will snap behind its collar 31 and thus lock the rod 29'. The two halves of the millboard are delivered up to some laying-off mechanism, which I do not describe here as it is immaterial to my invention.

Where so preferred, the helical springs 12, 12 may be disposed on one end disk 43 without the forming cylinder 3 instead of within the latter, as is for example illustrated at Figs. 10 and 11. Here two bell-crank levers 44, 45 are mounted on suitable pins to rock and their arms 44, 44 are connected with suitable lugs 42, 42 on the end disk 43 by helical springs 12, 12. The other arms 45, 45 are forked and are made to engage behind pins 46, 46 in the rods 20, 20 of the knives. The effect of this modified mechanism is exactly the same as described above.

Figure 13:
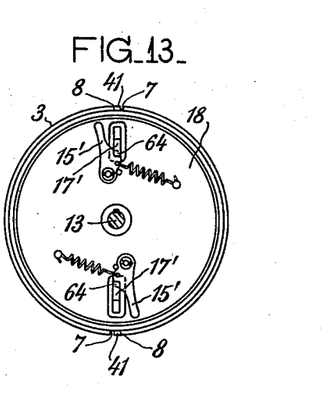
Fig. 13 is an end view of this modified forming cylinder.
Figure 14:
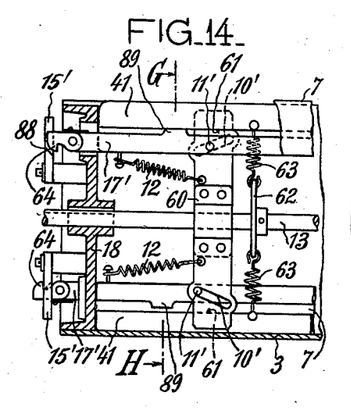
Fig. 14 is similar to Fig. 12 and shows the upper knife in its position at the moment that it cuts through the cover.
Figure 15:
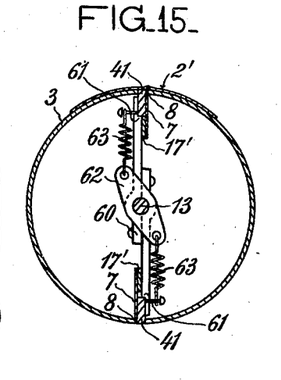
Fig. 15 is a vertical cross section through the line G—H in Fig. 14.
Figure 16:
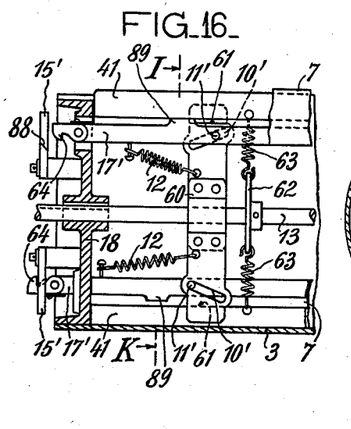
Fig. 16 is similar to Fig. 14 and shows the upper knife in another position so that its pushing-off rule presses the edge of the cut millboard outward.
Figure 17:
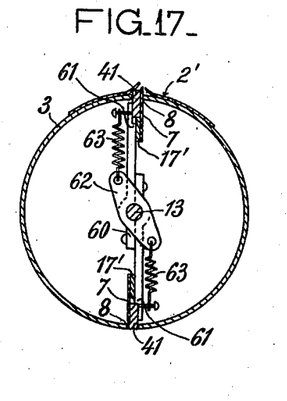
Fig. 17 is a vertical cross section through the line I—K in Fig. 16.

Figs. 12 to 16 illustrate a further modification of the forming cylinder. The two pushing-off rules 41, 41 are permitted to move only radially, as they are prevented by the two end disks 18 and 43 from longitudinal motion. They are connected by helical springs 63, 63 with two crossheads 62 fastened on the shaft 13, so that they are normally pressed on shoulders 61, 61 (Figs. 12 and 14) of arms 60, 60 fastened on the shaft 13 and are made to flush with the outer surface of the forming cylinder 3 (Figs. 13, 15 and 17 below). The knives 7, 7 are provided with pins 11', 11', which engage in inclined slots 10', 10' in the arms 60, 60, and are connected by helical springs 12, 12 with the arms 60, 60. Their ends 17', 17' carry spring-pressed pawls 64, 64, which are adapted to slide over inclined faces 88 (Fig. 16) of spring-pressed locks 15', 15' rocking on the end disk 18 and to snap behind them, whereby the knives 7, 7 are locked in their normal position. Evidently the roller 29 (Fig. 1) on being moved into the extreme position indicated by the dotted lines is adapted to strike and turn the two locks 15', 15' one after the other for releasing the knives 7, 7. The latter will first cut through the cover and then by their projections 89, 89 take the pushing-off rules 41, 41 along with them for pressing them on the millboard as described above. When the knives 7, 7 are pushed back into their initial position by the bent piece 19 of the disk 48, their spring-pressed pawls 64, 64 will slide over the inclined faces 88 and again snap behind the locks 15', 15'.

Figure 18:
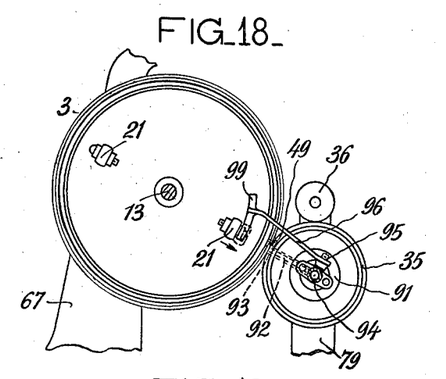
Fig. 18 is an end view of the forming cylinder, a roll provided with a vacuum device and the means operated from either knife for turning on the vacuum, and Fig. 19 corresponds to Fig. 18 and is a longitudinal section through parts of the forming cylinder and the roll, a left portion of the forming cylinder being shown in an upper view.
Figure 19:
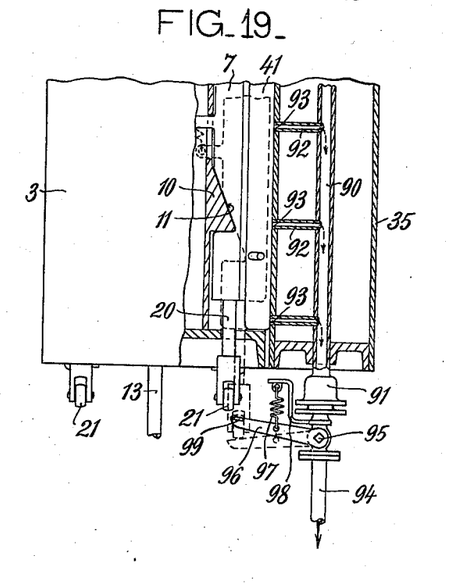

The roll 35 (Figs. 18 and 19) may have a hollow shaft 90 with a stuffing-box 91, and branch pipes 92, 92 connecting the cavity of the shaft 90 with holes 93, 93 in its mantle near the groove 49 (Fig. 3). A pipe 94 is connected with some cource of vacuum and with a cock 95, the other end of which engages in the stuffing-box 91, so that the roll 35 is permitted to turn, while its hollow shaft 90 can be periodically put in communication with the pipe 94 and shut off. This is effected by means of an arm 96, which is kept in its normal position shown in full lines by a helical spring 97 connecting the arm 96 with some bracket 98 on the cock. The arm 96 carries at its free end a bow 99 which is adapted to engage between the rollers 21, 21 and the annular disk 48 (Fig. 7). It will now be understood, that on the respective knife 7 being released, its roller 21 slipping off the disk 48 will strike the bow 99 and thereby turn the arm 96 into its other extreme position, so that a vacuum will be created in the hollow shaft 90 and the branch pipes 92, 92, whereby the end of the cut millboard will be pressed on the periphery of the roll 35, until it has passed between the two rolls 35 and 36, when the arm 96 released by the roller 21 will be returned to its initial position and shut off the pipe 94.

The mechanisms described can be varied in many respects without departing from the spirit of my invention.

I claim:

1. In a millboard-machine, the combination with a frame, of a driving roll in said frame, an endless felt passing over said driving roll and adapted to supply a layer of millboard material, two bearings vertically guided in said frame above said driving roll, a forming cylinder mounted in said two bearings to turn and adapted to bear on said felt and said driving roll for winding on the layer of material, means for loading said two bearings, said forming cylinder having two opposite longitudinal recesses, two pushing-off rules and two knives guided in the two longitudinal recesses of said forming cylinder, means for normally pressing said two pushing-off rules into one extreme position so that their outer surfaces flush with the outer surface of said forming cylinder, means for guiding said two knives diagonally, means for locking said two knives in one extreme position so that they do not project from said forming cylinder, means operated from said two bearings on the cover of said forming cylinder having attained a predetermined thickness for releasing said two knives one after the other, means for pressing said two knives into the other extreme position so that they first cut the cover through and project from said forming cylinder and then press said two pushing-off rules against the millboard, means for returning said two knives one after the other into their initial position, a first pressing roll mounted in said frame to turn and adapted to bear against said forming cylinder, it having a longitudinal groove into which said two knives can engage one after the other for cutting the millboard through, a second pressing roll above said first pressing roll and adapted to work with same for pulling the millboard off from said forming cylinder, and a gearing connecting said first pressing roll with said forming cylinder and said second pressing roll.

2. In a millboard-machine, the combination with a frame, of a driving roll in said frame, an endless felt passing over said driving roll and adapted to supply a layer of millboard material, two bearings vertically guided in said frame above said driving roll, a forming cylinder mounted in said two bearings to turn and adapted to bear on said felt and said driving roll for winding on the layer of material, means for loading said two bearings, said forming cylinder having two opposite longitudinal recesses, two pushing-off rules and two knives guided in the two longitudinal recesses of said forming cylinder, means for normally pressing said two pushing-off rules into one extreme position so that their outer surfaces flush with the outer surface of said forming cylinder, means for guiding said two knives diagonally, means for locking said two knives in one extreme position so that they do not project from said forming cylinder, means operated from said two bearings on the cover of said forming cylinder having attained a predetermined thickness for releasing said two knives one after the other, means for pressing said two knives into the other extreme position so that they first cut the cover through and project from said forming cylinder and then press said two pushing-off rules against the millboard, means for returning said two knives one after the other into their initial position, a first pressing roll mounted in said frame to turn and adapted to bear against said forming cylinder, it having a longitudinal groove into which said two knives can engage one after the other for cutting the millboard through, a second pressing roll above said first pressing roll and adapted to work with same for pulling the millboard off from said forming cylinder, a gearing connecting said first pressing roll with said forming cylinder and said second pressing roll, said first pressing roll having a hollow shaft with a stuffing-box and side branch channels leading from the hollow shaft to the mantle near the longitudinal groove, a valve engaging in the stuffing-box of said first pressing roll and having a spring-pressed arm adapted to be operated from said two knives one after the other, and a pipe adapted to connect said valve with a source of vacuum.

3. In a millboard-machine, the combination with a frame, of a driving roll in said frame, an endless felt passing over said driving roll and adapted to supply a layer of millboard material, two bearings vertically guided in said frame above said driving roll, a forming cylinder mounted in said two bearings to turn and adapted to bear on said felt and said driving roll for winding on the layer of material, two weighted levers rocking in said frame, two rods connecting said two bearings with said two weighted levers, a horizontal lever rocking in said frame about a pin near the free end of one of said two weighted levers, a longitudinally adjustable connection between said horizontal lever and said one weighted lever, a horizontal bolt guided in said frame and carrying a collar and at one end a roller near one end of said forming cylinder, a spring inserted between the collar of said horizontal bolt and a part of the frame for pressing the bolt forward, a spring-pressed lock rocking on said frame and adapted to snap behind the collar of said bolt on the latter being pushed rearward, means for adjustably connecting said spring-pressed lock with the free end of said horizontal lever, said forming cylinder having two opposite longitudinal recesses, two pushing-off rules and two knives guided in the two longitudinal recesses of said forming cylinder, means for normally pressing said two pushing-off rules into one extreme position so that their outer surfaces flush with the outer surface of said forming cylinder, means for guiding said two knives diagonally, two spring-pressed locks on said two knives adapted to lock the latter in one extreme position so that they do not project from said forming cylinder, said roller of said horizontal bolt being adapted to strike said two spring-pressed locks and thereby to release said two knives one after the other on the cover of said forming cylinder having attained a predetermined thickness, means for pressing said two knives into the other extreme position so that they first cut the cover through and project from said forming cylinder and then press said two pushing-off rules against the millboard, two cams on one end of said forming cylinder adapted to push one after the other said horizontal bolt into its initial position, and means for returning said two knives one after the other into their initial position.

In testimony whereof I affix my signature in presence of two witnesses.

SIDNEY SCOOLER.

Witnesses:
PAUL ARRAS,
ULYSSES J. BYWATER.

Copies of this patent may be obtained for five cents each, by addressing the "Commissioner of Patents, Washington, D. C."